United States Patent
Nagasaki et al.

(10) Patent No.: US 10,365,551 B2
(45) Date of Patent: Jul. 30, 2019

(54) WAVELENGTH CONVERSION MEMBER INCLUDING PHOSPHOR

(71) Applicant: Panasonic Corporation, Osaka (JP)

(72) Inventors: Yoshihisa Nagasaki, Osaka (JP); Takashi Ohbayashi, Osaka (JP); Kojiro Okuyama, Nara (JP)

(73) Assignee: PANASONIC CORPORATION, Osaka (JP)

( * ) Notice: Subject to any disclaimer, the term of this patent is extended or adjusted under 35 U.S.C. 154(b) by 60 days.

(21) Appl. No.: 15/468,179

(22) Filed: Mar. 24, 2017

(65) Prior Publication Data
US 2017/0307968 A1 Oct. 26, 2017

(30) Foreign Application Priority Data

Apr. 22, 2016 (JP) .................. 2016-086113

(51) Int. Cl.
*F21K 9/64* (2016.01)
*G03B 21/20* (2006.01)
(Continued)

(52) U.S. Cl.
CPC ........ *G03B 21/204* (2013.01); *C09K 11/7734* (2013.01); *C09K 11/7739* (2013.01); *C09K 11/7774* (2013.01); *F21S 41/143* (2018.01); *F21S 41/16* (2018.01); *F21S 41/176* (2018.01); *F21K 9/64* (2016.08); *F21S 41/285* (2018.01); *F21S 41/321* (2018.01); *F21V 9/30* (2018.02);
(Continued)

(58) Field of Classification Search
CPC .................... G03B 21/204; F21S 41/176
See application file for complete search history.

(56) References Cited

U.S. PATENT DOCUMENTS

2005/0105301 A1  5/2005  Takeda et al.
2006/0226759 A1* 10/2006  Masuda ............ C09K 11/0883
                                                   313/486
(Continued)

FOREIGN PATENT DOCUMENTS

JP   2005-150041   6/2005
JP   2015-005650   1/2015
(Continued)

*Primary Examiner* — Jong-Suk (James) Lee
*Assistant Examiner* — Christopher E Dunay
(74) *Attorney, Agent, or Firm* — McDermott Will & Emery LLP

(57) ABSTRACT

A wavelength conversion member comprises: a substrate; and a wavelength conversion layer. The wavelength conversion layer contains a first phosphor and a second phosphor. The second phosphor has a higher thermal conductivity than the first phosphor. In the wavelength conversion layer, a volume of the second phosphor is larger than a volume of the first phosphor. The wavelength conversion layer includes a first portion and a second portion. The first portion is located closer to the substrate than the second portion, and is in direct contact with the second portion. Thicknesses of the first portion and the second portion are equal to each other. A volume V11 of the first phosphor in the first portion, a volume V12 of the second phosphor in the first portion, a volume V21 of the first phosphor in the second portion, and a volume V22 of the second phosphor in the second portion satisfy V11/V12<V21/V22.

18 Claims, 4 Drawing Sheets

(51) Int. Cl.
*C09K 11/77* (2006.01)
*F21S 41/143* (2018.01)
*F21S 41/16* (2018.01)
*F21S 41/176* (2018.01)
*F21Y 115/30* (2016.01)
*F21S 41/20* (2018.01)
*F21Y 115/10* (2016.01)
*F21S 41/32* (2018.01)
*F21V 9/30* (2018.01)

(52) U.S. Cl.
CPC ........ *F21Y 2115/10* (2016.08); *F21Y 2115/30* (2016.08); *G03B 21/2066* (2013.01)

(56) References Cited

U.S. PATENT DOCUMENTS

| | | | | |
|---|---|---|---|---|
| 2007/0278935 | A1* | 12/2007 | Harada | C09K 11/0883 313/503 |
| 2008/0012031 | A1* | 1/2008 | Jang | C09K 11/02 257/89 |
| 2008/0231170 | A1* | 9/2008 | Masato | C09K 11/565 313/501 |
| 2009/0140630 | A1* | 6/2009 | Kijima | C09K 11/661 313/498 |
| 2009/0194781 | A1* | 8/2009 | Harada | C09K 11/025 257/98 |
| 2010/0142182 | A1* | 6/2010 | Van Woudenberg | G02F 1/133603 362/84 |
| 2012/0320607 | A1* | 12/2012 | Kinomoto | H01L 27/322 362/351 |
| 2015/0102722 | A1* | 4/2015 | Ohbayashi | F21S 41/14 313/498 |
| 2016/0102820 | A1* | 4/2016 | Chang | F21K 9/64 362/84 |
| 2016/0327244 | A1 | 11/2016 | Annen et al. | |
| 2017/0160627 | A1* | 6/2017 | Ikesue | G03B 21/204 |

FOREIGN PATENT DOCUMENTS

| | | |
|---|---|---|
| WO | 2014/203479 | 12/2014 |
| WO | 2015/098258 | 7/2015 |

\* cited by examiner

WAVELENGTH CONVERSION MEMBER INCLUDING PHOSPHOR

BACKGROUND

1. Technical Field

The present disclosure relates to a wavelength conversion member including a phosphor that performs wavelength conversion of excitation light to provide light having longer wavelengths, and to a projector including the wavelength conversion member.

2. Description of the Related Art

Hitherto, a vehicular lamp unit for generating light has been proposed which includes a semiconductor light-emitting element that generates light, a phosphor that is disposed at a position spaced from the semiconductor light-emitting element, a first optical member that condenses the light generated from the semiconductor light-emitting element to the phosphor, and a second optical member that casts, to the outside of the light unit, light having been generated from the phosphor corresponding to the light condensed by the first optical member (Japanese Unexamined Patent Application Publication No. 2005-150041).

SUMMARY

One non-limiting and exemplary embodiment provides a wavelength conversion member and a projector each of which is able to improve light emission efficiency or to adjust an emission color.

In one general aspect, the techniques disclosed here feature a wavelength conversion member including a substrate, and a wavelength conversion layer that has a first surface in direct contact with the substrate and a second surface opposite to the first surface. The wavelength conversion layer contains a first phosphor that emits first light having longer wavelengths than excitation light, and a second phosphor that emits second light having longer wavelengths than the excitation light. The second phosphor has a higher thermal conductivity than the first phosphor. In the wavelength conversion layer, a volume of the second phosphor is larger than a volume of the first phosphor. The wavelength conversion layer includes a first portion having the first surface and a second portion having the second surface. The first portion is located closer to the substrate than the second portion. The first portion is in direct contact with the second portion. Thicknesses of the first portion and the second portion are equal to each other. A volume $V11$ of the first phosphor in the first portion, a volume $V12$ of the second phosphor in the first portion, a volume $V21$ of the first phosphor in the second portion, and a volume $V22$ of the second phosphor in the second portion satisfy $V11/V12 < V21/V22$.

According to the present disclosure, it is possible to improve light emission efficiency or to adjust an emission color.

It should be noted that general or specific embodiments may be implemented as a wavelength conversion member, a projector, a device, an apparatus, a system, a method, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
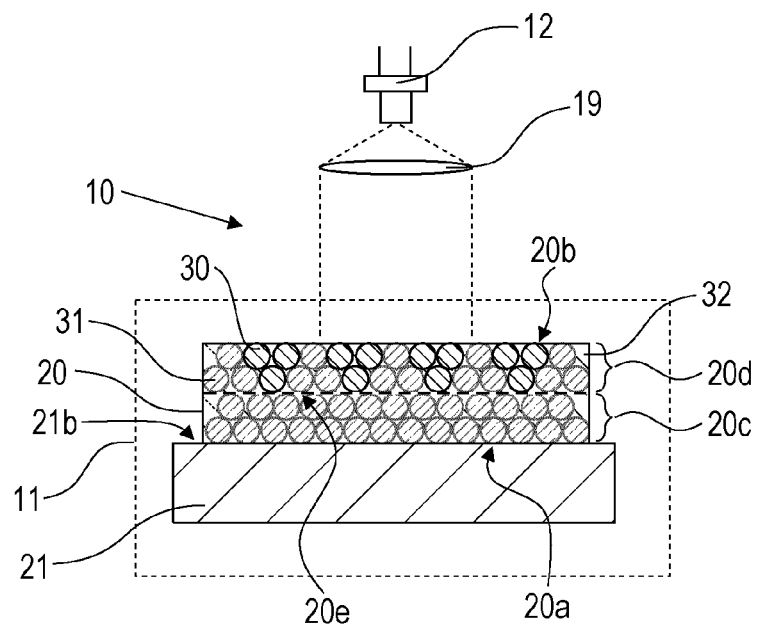
FIG. 1 is a sectional view schematically illustrating a structure of a light source according to a first embodiment.

A wavelength conversion member according to one aspect of the present disclosure includes a substrate, and a wavelength conversion layer that has a first surface in direct contact with the substrate and a second surface opposite to the first surface. The wavelength conversion layer contains a first phosphor that emits first light having longer wavelengths than excitation light, and a second phosphor that emits second light having longer wavelengths than the excitation light. The second phosphor has a higher thermal conductivity than the first phosphor. In the wavelength conversion layer, a volume of the second phosphor is larger than a volume of the first phosphor. The wavelength conversion layer includes a first portion having the first surface and a second portion having the second surface. The first portion is located closer to the substrate than the second portion. The first portion is in direct contact with the second portion. Thicknesses of the first portion and the second portion are equal to each other. A volume $V11$ of the first phosphor in the first portion, a volume $V12$ of the second phosphor in the first portion, a volume $V21$ of the first phosphor in the second portion, and a volume $V22$ of the second phosphor in the second portion satisfy $V11/V12 < V21/V22$. The first light and the second light may be fluorescence or phosphorescence. The first phosphor may include phosphor particles. The second phosphor may also include phosphor particles. In the case that the first phosphor consists of first phosphor particles and the second phosphors consists of second phosphor particles, $V11$, $V12$, $V21$ and $V22$ are calculated as follows: $V11$ is the sum of the volumes of all first phosphor particles included in the first portion; $V12$ is the sum of the volumes of all second phosphor particles included in the first portion; $V21$ is the sum of the volumes of all first phosphor particles included in the second portion; and $V22$ is the sum of the volumes of all second phosphor particles included in the second portion.

$V11/V12$ may be 0. The second surface of the wavelength conversion layer may be a surface on which the excitation light from the semiconductor light-emitting element is incident. The second surface may be a surface from which at least one selected from the group consisting of the first light and the second light is emitted. A peak wavelength of the first light may be shorter than a peak wavelength of the second light. The first phosphor may be a phosphor expressed by $(Sr_{1-x}Ba_x)_5P_3O_{12}Cl:Eu^{2+}$ [$0 \leq x \leq 1$]. The first phosphor may be a phosphor expressed by $(Y_{1-y}Gd_y)_3(Al_{1-z}Ga_z)_5O_{12}:Ce^{3+}$ [$0 \leq y < 1$, $0 \leq z < 1$]. The second phosphor may be a phosphor expressed by $(Y_{1-y}Gd_y)_3(Al_{1-z}Ga_z)_5O_{12}:Ce^{3+}$ [$0 \leq y < 1$, $0 \leq z < 1$]. The second phosphor may be a phosphor expressed by $Lu_3Al_5O_{12}:Ce^{3+}$. The second portion may contain at least part of the first phosphor and at least part of the second phosphor.

A projector according to one aspect of the present disclosure includes a semiconductor light-emitting element that emits the excitation light having a peak wavelength of not shorter than 380 nm and not longer than 420 nm, and the wavelength conversion member on which the excitation light is incident, Several embodiments of the present disclosure will be described below with reference to the drawings. It is to be noted that various elements illustrated in the drawings are schematically depicted merely for the sake of understanding of the present disclosure, and that dimensional ratios and external appearances of the elements may be different from actual ones. In the following, the same or similar components are denoted by the same reference signs and description of those components is omitted in some cases.

First Embodiment

Figure 2:
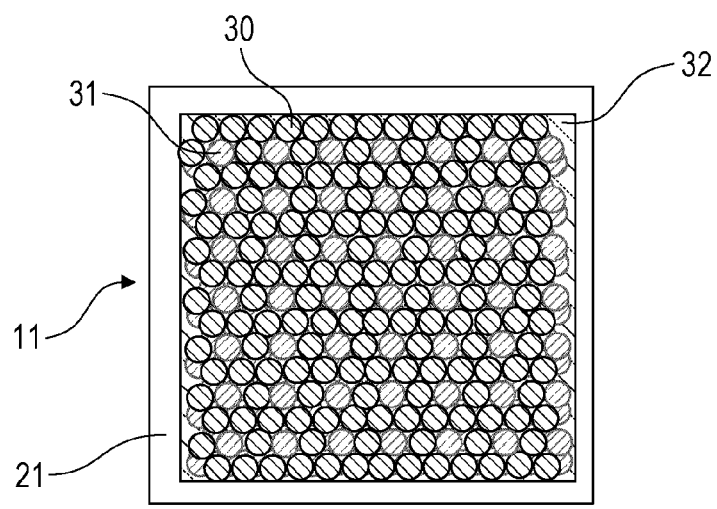
FIG. 2 is a plan view schematically illustrating the structure of the light source according to the first embodiment.

FIGS. 1 and 2 schematically illustrate a structure of a light source 10 according to a first embodiment of the present disclosure. The light source 10 includes a wavelength conversion member 11 and a semiconductor light-emitting element 12. The semiconductor light-emitting element 12 emits excitation light, whereas the wavelength conversion member 11 receives the excitation light and emits fluorescence (or phosphorescence) having longer wavelengths than the excitation light. The semiconductor light-emitting element 12 is, e.g., an LED, a superluminescent diode (SLD), or a laser diode (LD). This embodiment is described in connection with the case where the semiconductor light-emitting element 12 is an LD. The semiconductor light-emitting element 12 may be constituted by one LD or a plurality of LD's optically coupled with each other. The semiconductor light-emitting element 12 emits blue-violet light, for example. In the present disclosure, the term "blue-violet light" stands for light having a peak wavelength of not shorter than 380 nm and not longer than 420 nm. The light source 10 further includes an incident optical system 19. The incident optical system 19 may be positioned in an optical path of the excitation light emitted from the semiconductor light-emitting element 12. The incident optical system 19 includes, e.g., a lens, a mirror, and an optical fiber, or an optional combination of those components.

As described above, the wavelength conversion member 11 converts the excitation light from the semiconductor light-emitting element 12 to the fluorescence having the longer wavelength than the excitation light. The wavelength conversion member 11 includes a wavelength conversion layer 20 and a substrate 21. The substrate 21 supports the wavelength conversion layer 20. Furthermore, the substrate 21 transfers heat generated from the wavelength conversion layer 20 to the outside of the wavelength conversion member 11, thus suppressing a temperature of the wavelength conversion layer 20 from rising excessively. The substrate 21 is, for example, a metal substrate (made of, e.g., aluminum or iron), a crystal substrate (made of, e.g., silicon, sapphire, or GaN), or a ceramic substrate (made of, e.g., alumina). Between the substrate 21 and the wavelength conversion layer 20, a metal film (made of, e.g., silver or aluminum), a dielectric multilayer film, or a multilayer structure of a metal thin film and a dielectric film may be disposed to increase the reflectance of the substrate 21.

Desirably, the substrate 21 has a higher thermal conductivity than the wavelength conversion layer 20. More desirably, the substrate 21 has a higher thermal conductivity than a second phosphor 31 described later, which is contained in the wavelength conversion layer 20.

The wavelength conversion layer 20 has a first surface 20a contacting the substrate 21, and a second surface 20b positioned on the side opposite to the first surface 20a. Furthermore, the wavelength conversion layer 20 includes a first portion 20c and a second portion 20d. The first portion 20c and the second portion 20d are each in the form of a layer. The first portion 20c includes the first surface 20a, and it is positioned on the side closer to the substrate 21 than the second surface 20b. The second portion 20d includes the second surface 20b, and it is in direct contact with the first portion 20c. A thickness of the first portion 20c and a thickness of the second portion 20d are equal to each other. The first portion 20c and the second portion 20d may be two layers that are fabricated in separate steps in a process of fabricating the wavelength conversion layer 20. Alternatively, the first portion 20c and the second portion 20d may be formed integrally with each other. The wavelength conversion layer 20 may be formed by laminating two or more layers, and a position of the boundary between adjacent two among the two or more laminated layers may not be aligned with a position of the boundary between the first portion 20c and the second portion 20d. In other words, the first portion 20c and the second portion 20d may be discriminated from each other by a virtual boundary insofar as the first portion 20c and the second portion 20d have the same thickness.

The wavelength conversion layer 20 contains at least a first phosphor 30 and a second phosphor 31. The wavelength conversion layer 20 may further contain a matrix material 32 for fixedly holding the first phosphor 30 and the second phosphor 31. The matrix material 32 may be, e.g., glass, a silicone resin, an organic-inorganic hybrid material, or a transparent inorganic material such as $Al_2O_3$ or ZnO.

A volume ratio of the first phosphor 30 to the second phosphor 31 in the first portion 20c is smaller than a volume ratio of the first phosphor 30 to the second phosphor 31 in the second portion 20d. Note that, the "volume ratio of X to Y in Z" in the present disclosure is calculated by dividing the volume of X contained in Z by the volume of Y contained in Z. As illustrated in FIG. 1, by way of example, the first portion 20c may not contain the first phosphor 30, and the second portion 20d may contain both the first phosphor 30 and the second phosphor 31. Alternatively, each of the first portion 20c and the second portion 20d may contain both the first phosphor 30 and the second phosphor 31, and the volume ratios in the first portion 20c and the second portion 20d may satisfy the above-described condition.

Let assume here that respective volumes of the first phosphor 30 and the second phosphor 31 in the first portion 20c are denoted by v11 and v12, and that respective volumes of the first phosphor 30 and the second phosphor 31 in the second portion 20d are denoted by v21 and v22. On such an assumption, the volume ratio of the first phosphor 30 to the second phosphor 31 in the first portion 20c is expressed by v11/v12, and the volume ratio of the first phosphor 30 to the second phosphor 31 in the first portion 20d is expressed by v21/v22. Accordingly, the first phosphor 30 and the second phosphor 31 in the first portion 20c and the second portion 20d satisfy the following relation:

$$v11/v12 < v21/v22 \qquad (1)$$

The following relation may be further satisfied:

$$0 \leq v11/v12 < v21/v22 \quad (2)$$

Insofar as the above relation (1) is satisfied, the first phosphor 30 and the second phosphor 31 may be evenly distributed or not evenly distributed in the first portion 20c and the second portion 20d. In the second portion 20d, the first phosphor 30 is desirably distributed at a higher volume density on the side closer to the second surface 20b than on the side closer to a surface 20e of the second portion 20d, the surface 20e being in contact with the first portion 20c. For example, the first phosphor 30 may be distributed only near the second surface 20b.

Moreover, in the wavelength conversion layer 20, the first phosphor 30 and the second phosphor 31 satisfy the following relation:

$$v11+v21 < v12+v22 \quad (3)$$

Stated in another way, a volume of the second phosphor 31 is larger than that of the first phosphor 30.

The volume ratio of the first phosphor 30 to the second phosphor 31 in each of the first portion 20c and the second portion 20d can be determined, for example, by observing a cross-section of the wavelength conversion layer 20 with, e.g., an electron microscope. More specifically, the wavelength conversion layer 20 is cut to form a cross-section perpendicular to both the first surface 20a and the second surface 20b, and an area s11 of the first phosphor 30 and an area s12 of the second phosphor 31 in the first portion 20c, which appears in the cross-section, are determined by observing the cross-section with, e.g., an electron microscope. When it can be assumed that, in a plane parallel to the first surface 20a and the second surface 20b, the first phosphor 30 and the second phosphor 31 are each evenly distributed without any regularity, an area ratio s11/s12 is substantially in agreement with v11/v12. Likewise, an area ratio s21/s22 in the second portion 20d can be determined and can be used as a value of v21/v22.

When the first portion 20c and the second portion 20d are formed as separate layers, respective volume ratios of the first phosphor 30 to the second phosphor 31 used to form the first portion 20c and the second portion 20d can be used as values of v11/v12 and v21/v22.

FIG. 2 schematically illustrates respective distributions of the first phosphor 30 and the second phosphor 31 in the vicinity of the second surface 20b when looking at the vicinity of the second surface 20b from above. The expression "vicinity of the second surface 20b" represents, for example, a region until reaching a depth of about 20 μm from the second surface 20b. As illustrated in FIG. 2, the first phosphor 30 and the second phosphor 31 are both present in the vicinity of the second surface 20b. Although FIG. 2 illustrates that respective particles of the first phosphor 30 and the second phosphor 31 are regularly arranged, the first phosphor 30 and the second phosphor 31 may be arranged in the vicinity of the second surface 20b regardless of being regularly or irregularly.

In this embodiment, a thermal conductivity of the first phosphor 30 is smaller than that of the second phosphor 31. A peak wavelength of a light emission spectrum of the first phosphor 30 may be shorter than that of the second phosphor 31. The first phosphor 30 is, e.g., a blue phosphor. In the present disclosure, the term "blue phosphor" stands for a phosphor having the peak wavelength of the light emission spectrum in the range of not shorter than 420 nm and not longer than 480 nm. In one example, the first phosphor 30 may be a phosphor expressed by $(Sr_{1-x}Ba_x)_5P_3O_{12}Cl:Eu^{2+}$ [0≤x≤1] and having a thermal conductivity of 3 W/m·K. As an alternative, the first phosphor 30 may be a phosphor expressed by $(Sr_{1-n}Ba_n)_3MgSi_2O_8:Eu^{2+}$ [0≤n≤1] and having a thermal conductivity of 2 W/m·K.

The second phosphor 31 is, e.g., a yellow phosphor. In the present disclosure, the term "yellow phosphor" stands for a phosphor having the peak wavelength of the light emission spectrum in the range of not shorter than 510 nm and not longer than 580 nm. In one example, the second phosphor 31 may be a phosphor expressed by $(Y_{1-y}Gd_y)_3(Al_{1-z}Ga_z)_5O_{12}:Ce^{3+}$ [0≤y<1, 0≤z<1] and having a thermal conductivity of 11 W/m·K. As an alternative, the second phosphor 31 may be a phosphor expressed by $Lu_3Al_5O_{12}:Ce^{3+}$ and having a thermal conductivity of 11 W/m·K.

The wavelength conversion layer 20 including the first portion 20c and the second portion 20d can be fabricated, for example, in accordance with the following procedures. Initially, a silicone resin composition is prepared as a base material of the matrix material 32. A first base material containing the second phosphor 31 dispersed in the silicone resin composition, and a second base material containing the first phosphor 30 and the second phosphor 31 both dispersed in the silicone resin composition at a predetermined ratio are also prepared.

First, a first layer is formed on the substrate 21 by coating the first base material with a printing process, for example. Then, a second layer is formed on the first layer by coating the second base material with the printing process. Then, the first layer and the second layer are hardened by applying energy, such as heat or ultraviolet rays. As a result, the wavelength conversion layer 20 including the first portion 20c and the second portion 20d can be formed. On that occasion, the first portion 20c may be formed by the first layer, and the second portion 20d may be formed by the second layer. Alternatively, part of the first layer may be included in the second portion 20d, or part of the second layer may be included in the first portion 20c.

The operation of the light source 10 will be described below. The excitation light emitted from the semiconductor light-emitting element 12 passes through the incident optical system 19 and enters the second surface 20b of the wavelength conversion layer 20 on the side not contacting the substrate 21 of the wavelength conversion member 11. Part of the excitation light excites the first phosphor 30, and it is converted to blue light. Part of the converted blue light is emitted from the second surface 20b directly to the outside of the wavelength conversion member 11, or after being scattered inside the wavelength conversion member 11 or being reflected by the substrate 21. The other part of the blue light excites the second phosphor 31 inside the wavelength conversion member 11, and it is converted to yellow light. Furthermore, the other part of the excitation light emitted from the semiconductor light-emitting element 12 excites directly the second phosphor 31, and it is converted to yellow light. Those converted yellow lights are emitted from the second surface 20b directly to the outside of the wavelength conversion member 11, or after being scattered inside the wavelength conversion member 11 or being reflected by the substrate 21. The above-mentioned yellow lights and blue light are mixed together to generate white light. The chromaticity of the white light can be adjusted as appropriate by, mainly in the second portion 20d, changing the volume ratio of the first phosphor 30 and the second phosphor 31.

The volume ratio of the first phosphor 30 to the second phosphor 31 in the first portion 20c is smaller than that of the first phosphor 30 to the second phosphor 31 in the second portion 20d. Moreover, the second phosphor has a higher thermal conductivity than the first phosphor. Therefore, the first portion 20c has a higher thermal conductivity than the second portion 20d. As a result, heat generated by the excitation light in the first phosphor 30 and the second phosphor 31 in the first portion 20c and the second portion 20d is conducted to the first portion 20c from the second portion 20d, and is further conducted to the substrate 21. Hence the generated heat can be efficiently released to the outside of the wavelength conversion member 11.

Thus, according to the first embodiment of the present disclosure, since the first portion 20c contacting the substrate 21 has a higher thermal conductivity than the second portion 20d, the heat generated during the wavelength conversion can be efficiently conducted to the substrate 21 and released to the outside. Furthermore, since a blue luminescent phosphor provided by the first phosphor 30 and a yellow luminescent phosphor provided by the second phosphor 31 are both present in the second portion 20d having the second surface 20b on which the excitation light emitted from the semiconductor light-emitting element 12 of the wavelength conversion member 11 is incident, the excitation light emitted from the semiconductor light-emitting element 12 excites directly not only the blue luminescent phosphor provided by the first phosphor 30, but also part of the yellow luminescent phosphor provided by the second phosphor 31. Thus, since part of a yellow luminescence component is subjected to wavelength conversion without being temporarily converted to a blue luminescence component, the wavelength conversion can be performed with high conversion efficiency. Consequently, light emission efficiency is increased. Moreover, a temperature rise of the wavelength conversion member 11 can be suppressed. In addition, a color of the light emitted from the wavelength conversion member 11 can be adjusted by changing the volume ratio of the first phosphor 30 and the second phosphor 31 that are present mainly in the second portion 20d.

Second Embodiment

Figure 3:
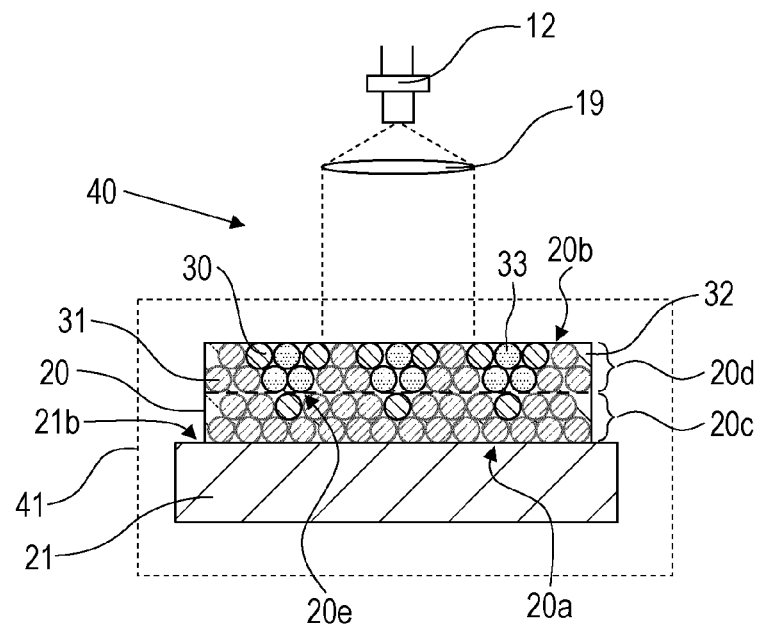
FIG. 3 is a sectional view schematically illustrating a structure of a light source according to a second embodiment.
Figure 4:
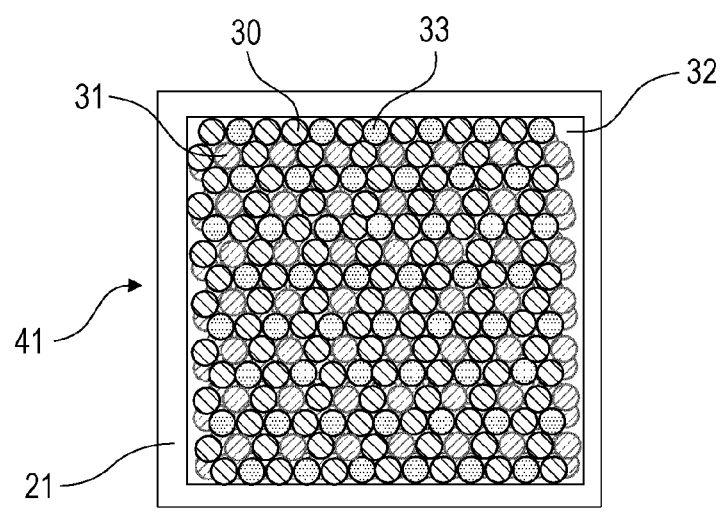
FIG. 4 is a plan view schematically illustrating the structure of the light source according to the second embodiment.

FIGS. 3 and 4 schematically illustrate a structure of a light source 40 according to a second embodiment of the present disclosure. The second embodiment is different from the first embodiment in that a wavelength conversion member 41 contains a first phosphor 30, a second phosphor 31, and a third phosphor 33. The third phosphor may include phosphor particles.

There are no particular limitations on the thermal conductivity of the third phosphor 33. A volume ratio of a total of the first phosphor 30 and the third phosphor 33 to the second phosphor 31 in the first portion 20c is smaller than that of a total of the first phosphor 30 and the third phosphor 33 to the second phosphor 31 in the second portion 20d.

FIG. 4 schematically illustrates respective distributions of the first phosphor 30, the second phosphor 31, and the third phosphor 33 in the vicinity of the second surface 20b when looking at the vicinity of the second surface 20b from above. As illustrated in FIG. 4, the first phosphor 30, the second phosphor 31, and the third phosphor 33 are all present in the vicinity of the second surface 20b. Although FIG. 4 illustrates that respective particles of the first phosphor 30, the second phosphor 31, and the third phosphor 33 are regularly arranged, the first phosphor 30, the second phosphor 31, and the third phosphor 33 may be arranged in the vicinity of the second surface 20b regardless of being regularly or irregularly.

In this embodiment, a peak wavelength of a light emission spectrum of the first phosphor 30 may be shorter than that of the second phosphor 31. A peak wavelength of a light emission spectrum of the third phosphor 33 may be longer than that of the second phosphor 31.

The first phosphor 30 and the second phosphor 31 are, e.g., a blue phosphor and a yellow phosphor, respectively, and they can be made of the same base materials as those used in the first embodiment. The third phosphor 33 is, e.g., a red phosphor. In the present disclosure, the term "red phosphor" stands for a phosphor having the peak wavelength of the light emission spectrum in the range of not shorter than 580 nm and not longer than 680 nm. There are no particular limitations on a material composition of the red phosphor. The red phosphor may be made of a phosphor containing any one of $Eu^{2+}$, $Eu^{3+}$, and $Ce^{3+}$, for example, as an emission center.

The operation of the light source 40 will be described below. The excitation light emitted from the semiconductor light-emitting element 12 passes through the incident optical system 19 and enters the second surface 20b of the wavelength conversion layer 20 on the side not contacting the substrate 21 of the wavelength conversion member 41. Part of the excitation light excites the first phosphor 30, and it is converted to blue light. Part of the converted blue light is emitted from the second surface 20b directly to the outside of the wavelength conversion member 41, or after being scattered inside the wavelength conversion member 41 or being reflected by the substrate 21. The other part of the blue light excites the second phosphor 31 and the third phosphor 33 inside the wavelength conversion member 41, and it is converted to yellow light and red light. Furthermore, another part of the excitation light emitted from the semiconductor light-emitting element 12 excites directly the second phosphor 31, and it is converted to yellow light. Those converted yellow lights and red light are emitted directly to the outside of the wavelength conversion member 41, or after being scattered inside the wavelength conversion member 41 or being reflected by the substrate 21.

Moreover, part of the above-mentioned yellow lights excites the third phosphor 33 inside the wavelength conversion member 41, and it is converted to red light. Still other part of the excitation light emitted from the semiconductor light-emitting element 12 excites directly the third phosphor 33, and it is converted to red light. Those converted red lights are emitted directly to the outside of the wavelength conversion member 41, or after being scattered inside the wavelength conversion member 41 or being reflected by the substrate 21. Mixed light in a color resulting from mixing of the above-mentioned red lights, yellow lights, and blue light is emitted from the second surface 20b. The color of the mixed light can be adjusted as appropriate by, mainly in the second portion 20d, changing the volume ratio among the first phosphor 30, the second phosphor 31, and the third phosphor 33.

As described above, the second embodiment of the present disclosure can realize not only high light emission efficiency with the highly-efficient wavelength conversion and suppression of a temperature rise of the wavelength conversion member 41 as in the first embodiment, but also generation of a light color other than those that can be synthesized from yellow light and blue light.

Third Embodiment

Figure 5:
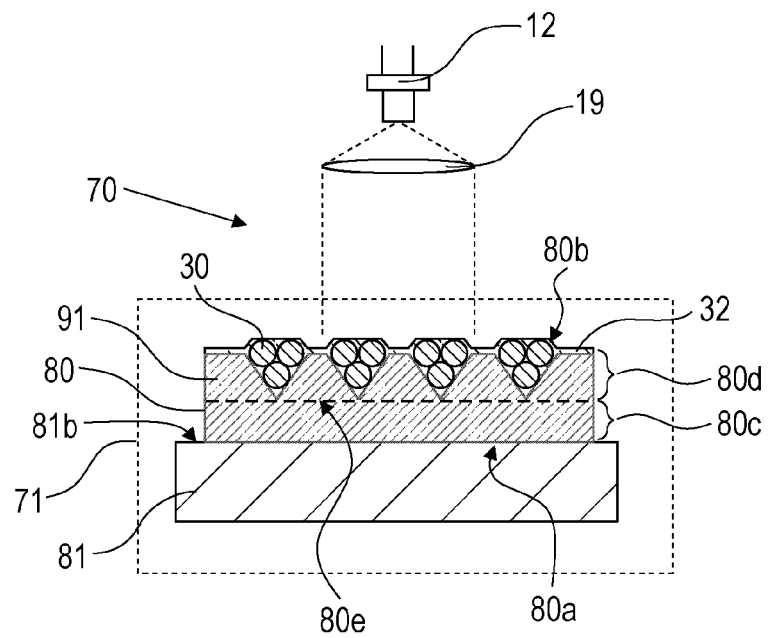
FIG. 5 is a sectional view schematically illustrating a structure of a light source according to a third embodiment.
Figure 6:
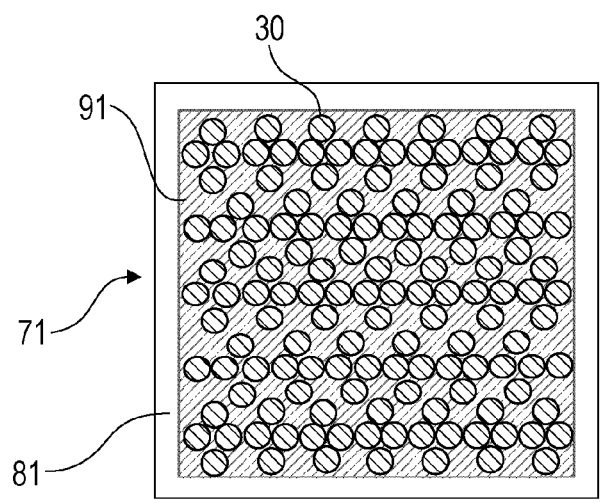
FIG. 6 is a plan view schematically illustrating the structure of the light source according to the third embodiment.

FIGS. 5 and 6 schematically illustrate a structure of a light source 70 according to a third embodiment of the present disclosure. The third embodiment is described in connection with the case where the second phosphor constituting a wavelength conversion member 71 is a sintering ceramic instead of a particulate phosphor. The light source 70 includes the wavelength conversion member 71 and the semiconductor light-emitting element 12.

The wavelength conversion member 71 performs wavelength conversion of light from the semiconductor light-emitting element 12 to provide light having longer wavelengths. The wavelength conversion member 71 is constituted by a wavelength conversion layer 80, which contains two or more types of phosphors including at least a first phosphor 30 and a second phosphor 91, and by a substrate 81 that supports the wavelength conversion layer 80. The first phosphor 30 is, e.g., a particulate phosphor made of the same material as that used in the first embodiment. The wavelength conversion layer 80 may further contain a matrix material 32 for fixedly holding the first phosphor 30.

As in the first embodiment, the wavelength conversion layer 80 has a first surface 80a contacting the substrate 81, and a second surface 80b positioned on the side opposite to the first surface 80a. Furthermore, the wavelength conversion layer 80 includes a first portion 80c and a second portion 80d. The first portion 80c and the second portion 80d include respectively the first surface 80a and the second surface 80b. The second portion 80d is in contact with the first portion 80c. A volume ratio of the first phosphor 30 to the second phosphor 91 in the first portion 80c is smaller than a volume ratio of the first phosphor 30 to the second phosphor 91 in the second portion 80d. A thermal conductivity of the first phosphor 30 is lower than that of the second phosphor 91. A peak wavelength of a light emission spectrum of the first phosphor 30 is shorter than that of the second phosphor 91.

The second phosphor 91 is a sintering ceramic. The sintering ceramic may be a polycrystalline ceramic or a monocrystalline ceramic. The second phosphor 91 is, e.g., a yellow phosphor. As in the first embodiment, the second phosphor 91 may be, e.g., a phosphor expressed by $(Y_{1-y}Gd_y)_3(Al_{1-z}Ga_z)_5O_{12}:Ce^{3+}$ [$0 \leq y < 1$, $0 \leq z < 1$].

FIG. 6 schematically illustrates respective distributions of the first phosphor 30 and the second phosphor 91 in the vicinity of the second surface 80b when looking at the vicinity of the second surface 80b from above. As illustrated in FIG. 6, the first phosphor 30 and the second phosphor 91 are both present in the vicinity of the second surface 80b. Although FIG. 6 illustrates that the first phosphor 30 is regularly arranged in the second phosphor 91, the first phosphor 30 may be arranged in the vicinity of the second surface 80b regardless of being regularly or irregularly.

The wavelength conversion layer 80 can be fabricated, for example, in accordance with the following procedures. First, an oxide or the like containing an element, which constitutes the second phosphor 91, is prepared in accordance with a general ceramic synthesis procedure. Then, base materials including the prepared oxide are mixed together and are subjected to granulation. Thereafter, a compact is fabricated and sintered. The second phosphor 91 having the same external shape as of that of the wavelength conversion layer 80 is thus obtained. Separately, a silicone resin composition is prepared as a base material of the matrix material 32, and a first base material containing the first phosphor 30 dispersed in the silicone resin composition is prepared. Then, a mask, etc. are formed on a surface of the second phosphor 91. The first base material is coated on the surface of the second phosphor 91, on which the mask, etc. have been formed, by a screen printing process, for example. Because a ceramic surface is rough, part of the first base material is buried into the inside of the second phosphor 91 from the surface. Then, the silicone resin composition of the first base material is hardened, whereby the wavelength conversion layer 80 is completed.

The operation of the light source 70 will be described below. The excitation light emitted from the semiconductor light-emitting element 12 passes through the incident optical system 19 and enters the second surface 80b of the wavelength conversion layer 80 on the side not contacting the substrate 81 of the wavelength conversion member 71. Part of the excitation light excites the first phosphor 30, and it is converted to blue light. Part of the converted blue light is emitted from the second surface 80b directly to the outside of the wavelength conversion member 71, or after being scattered inside the wavelength conversion member 71 or being reflected by the substrate 81. The other part of the blue light excites the second phosphor 91 inside the wavelength conversion member 71, and it is converted to yellow light. Furthermore, the other part of the excitation light emitted from the semiconductor light-emitting element 12 excites directly the second phosphor 91, and it is converted to yellow light. Those converted yellow lights are emitted from the second surface 80b directly to the outside of the wavelength conversion member 71, or after being scattered inside the wavelength conversion member 71 or being reflected by the substrate 81. The above-mentioned yellow lights and blue light are mixed together to generate white light. The chromaticity of the white light can be adjusted as appropriate by, mainly in the second portion 80d, changing the volume ratio of the first phosphor 30 and the second phosphor 91.

In this embodiment, a light color other than those capable of being synthesized from yellow light and blue light can also be realized by mixing a red phosphor, as a third phosphor, with the first phosphor as in the second embodiment.

According to the third embodiment of the present disclosure, as described above, since the first portion 80c contacting the substrate 81 has a higher thermal conductivity than the second portion 80d, heat generated during the wavelength conversion can be efficiently conducted to the substrate 81 and released to the outside. Furthermore, since a blue luminescent phosphor provided by the first phosphor 30 and a yellow luminescent phosphor provided by the second phosphor 91 are both present in the second surface 80b on which the excitation light emitted from the semiconductor light-emitting element 12 of the wavelength conversion member 71 is incident, the excitation light emitted from the semiconductor light-emitting element 12 excites directly not only the blue luminescent phosphor provided by the first phosphor 30, but also part of the yellow luminescent phosphor provided by the second phosphor 91. Thus, since part of a yellow luminescence component is subjected to wavelength conversion without being temporarily converted to a blue luminescence component, the wavelength conversion can be performed with high conversion efficiency. Consequently, light emission efficiency is increased. Moreover, a temperature rise of the wavelength conversion member 71 can be suppressed.

Fourth Embodiment

Figure 7:
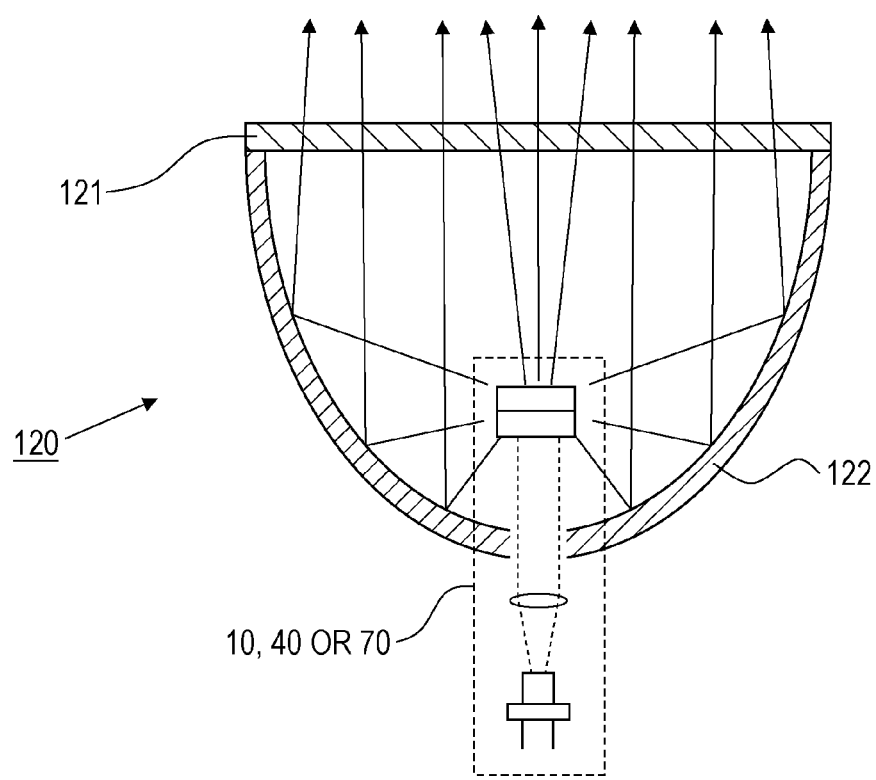
FIG. 7 schematically illustrates a structure of an illumination projector according to a fourth embodiment.

FIG. 7 schematically illustrates a structure of a projector 120 according to a fourth embodiment of the present disclosure. The projector 120 according to this embodiment includes any one of the light sources 10, 40 and 70 according to the first to third embodiments, and an emergent optical system 122 that guides light emitted from the light source forward. A wavelength cut filter 121 may be disposed to absorb or reflect blue-violet light from the semiconductor light-emitting element of the light source such that the blue-violet light is not leaked to the outside. The emergent optical system 122 is, e.g., a reflector. The emergent optical system 122 includes a metal film made of, e.g., Al or Ag, or an Ag film having a protective film coated on a surface of the film. The projector 120 may be of the so-called reflection type or the so-called projection type.

According to the fourth embodiment, the advantageous effects of the first to third embodiments can be obtained in the projector.

The wavelength conversion member according to the present disclosure can be used in light sources for special illumination, head-up displays, projectors, vehicular headlamps, and so on.

What is claimed is:

1. A wavelength conversion member comprising:
   a substrate; and
   a wavelength conversion layer that has a first surface in direct contact with the substrate, and a second surface opposite to the first surface,
   wherein the wavelength conversion layer contains a first phosphor that emits first light having longer wavelengths than excitation light, and a second phosphor that emits second light having longer wavelengths than the excitation light,
   the second phosphor has a higher thermal conductivity than the first phosphor,
   in the wavelength conversion layer, a volume of the second phosphor is larger than a volume of the first phosphor,
   the wavelength conversion layer includes a first portion having the first surface and a second portion having the second surface,
   the first portion is located closer to the substrate than the second portion, and is in direct contact with the second portion,
   thicknesses of the first portion and the second portion are equal to each other, and
   a volume V11 of the first phosphor in the first portion, a volume V12 of the second phosphor in the first portion, a volume V21 of the first phosphor in the second portion, and a volume V22 of the second phosphor in the second portion satisfy V11/V12<V21/V22,
   wherein the second surface of the wavelength conversion layer is a surface on which excitation light from a semiconductor light-emitting element is incident.

2. The wavelength conversion member according to claim 1, wherein V11/V12 is 0.

3. The wavelength conversion member according to claim 1, wherein the second surface is a surface from which at least one selected from the group consisting of the first light and the second light is emitted.

4. The wavelength conversion member according to claim 1, wherein a peak wavelength of the first light is shorter than a peak wavelength of the second light.

5. The wavelength conversion member according to claim 1, wherein the first phosphor is a phosphor expressed by $(Sr_{1-x}Ba_x)_5P_3O_{12}Cl:Eu^{2+}$ [$0\leq x\leq 1$].

6. The wavelength conversion member according to claim 1, wherein the first phosphor is a phosphor expressed by $(Sr_{1-x}Ba_x)_3MgSi_2O_8:Eu^{2+}$ [$0\leq x\leq 1$].

7. The wavelength conversion member according to claim 1, wherein the second phosphor is a phosphor expressed by $$(Y_{1-y}Gd_y)_3(Al_{1-z}Ga_z)_5O_{12}:Ce^{3+}\ [0\leq y<1, 0\leq z<1].$$

8. The wavelength conversion member according to claim 1, wherein the second phosphor is a phosphor expressed by $Lu_3Al_5O_{12}:Ce^{3+}$.

9. The wavelength conversion member according to claim 1, wherein the second portion contains at least part of the first phosphor and at least part of the second phosphor.

10. A projector comprising a semiconductor light-emitting element that emits excitation light having a peak wavelength of not shorter than 380 nm and not longer than 420 nm; and
    a wavelength conversion member on which the excitation light is incident,
    the wavelength conversion member comprising a substrate, and a wavelength conversion layer that has a first surface in direct contact with the substrate, and a second surface opposite to the first surface,
    wherein the wavelength conversion layer contains a first phosphor that emits first light having longer wavelengths than the excitation light, and a second phosphor that emits second light having longer wavelengths than the excitation light,
    the second phosphor has a higher thermal conductivity than the first phosphor,
    in the wavelength conversion layer, a volume of the second phosphor is larger than a volume of the first phosphor,
    the wavelength conversion layer includes a first portion having the first surface and a second portion having the second surface,
    the first portion is located closer to the substrate than the second portion, and is in direct contact with the second portion,
    thicknesses of the first portion and the second portion are equal to each other, and
    a volume V11 of the first phosphor in the first portion, a volume V12 of the second phosphor in the first portion, a volume V21 of the first phosphor in the second portion, and a volume V22 of the second phosphor in the second portion satisfy V11/V12<V21/V22,
    wherein the second surface of the wavelength conversion layer is a surface on which the excitation light from the semiconductor light-emitting element is incident.

11. The projector according to claim 10, wherein V11/V12 is 0.

12. The projector according to claim 10, wherein the second surface is a surface from which at least one selected from the group consisting of the first light and the second light is emitted.

13. The projector according to claim 10, wherein a peak wavelength of emission light from the first phosphor is shorter than a peak wavelength of emission light from the second phosphor.

14. The projector according to claim 10, wherein the first phosphor is a phosphor expressed by $(Sr_{1-x}Ba_x)_5P_3O_{12}Cl:Eu^{2+}$ [$0\leq x\leq 1$].

15. The projector according to claim 10, wherein the first phosphor is a phosphor expressed by $(Sr_{1-x}Ba_x)_3MgSi_2O_8:Eu^{2+}$ [$0\leq x\leq 1$].

16. The projector according to claim 10, wherein the second phosphor is a phosphor expressed by $(Y_{1-y}Gd_y)_3(Al_{1-z}Ga_z)_5O_{12}:Ce^{3+}$ [$0\leq y<1,\ 0\leq z<1$].

17. The projector according to claim 10, wherein the second phosphor is a phosphor expressed by $Lu_3Al_5O_{12}:Ce^{3+}$.

18. The projector according to claim 10, wherein the second portion contains at least part of the first phosphor and at least part of the second phosphor.

\* \* \* \* \*